(12) United States Patent
Inokuchi

(10) Patent No.: US 7,379,937 B2
(45) Date of Patent: May 27, 2008

(54) FREQUENT PATTERN MINING APPARATUS, FREQUENT PATTERN MINING METHOD, AND PROGRAM AND RECORDING MEDIUM THEREFOR

(75) Inventor: Akihiro Inokuchi, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 401 days.

(21) Appl. No.: 10/916,074

(22) Filed: Aug. 11, 2004

(65) Prior Publication Data

US 2005/0044073 A1    Feb. 24, 2005

(30) Foreign Application Priority Data

Aug. 18, 2003   (JP)   ............................. 2003-294668

(51) Int. Cl.
*G06F 17/30* (2006.01)
(52) U.S. Cl. ........................... 707/6; 707/101; 707/102
(58) Field of Classification Search ............. 707/1–10, 707/100–104.1, 200–206
See application file for complete search history.

(56) References Cited

U.S. PATENT DOCUMENTS

| | | | | |
|---|---|---|---|---|
| 6,085,193 | A * | 7/2000 | Malkin et al. | 707/10 |
| 6,263,335 | B1 * | 7/2001 | Paik et al. | 707/5 |
| 6,519,602 | B2 * | 2/2003 | Sundaresan et al. | 707/100 |
| 6,618,725 | B1 * | 9/2003 | Fukuda et al. | 707/6 |
| 6,625,585 | B1 * | 9/2003 | MacCuish et al. | 706/10 |
| 6,665,669 | B2 * | 12/2003 | Han et al. | 707/6 |
| 6,981,037 | B1 * | 12/2005 | Srikant et al. | 709/223 |
| 7,130,833 | B2 * | 10/2006 | Kashima et al. | 706/12 |
| 2003/0195890 | A1 * | 10/2003 | Oommen | 707/100 |

OTHER PUBLICATIONS

Cohen, Diagonally Subgraphs Pattern Mining, DMKD'04, Jun. 13, 2004, Copyright 2004 ACM. p. 51-58.*
Wang, Scallable Mining of Large Disk-based Graph Databases, KDD'04, Aug. 2004, Copyright 2004 ACM, p. 316-325.*
Wang, Parallel Algorithms for Mining Frequent Structural Motifs in Scientific Data, ICS'04, Jun. 2004, Copyright 2004 ACM, p. 31-41.*
Tatsuya Asai, Kenji Abe, Shinji Kawasoe, Hiroki Arimura, Hiroshi Sakamoto, S. Arikawa, Efficient Substructure Discovery from Large Semi-structured Data, Proc. of the Second SIAM International Conference on Data Mining (SDM2002), pp. 158-174, 2002.

(Continued)

*Primary Examiner*—Jean B. Fleurantin
*Assistant Examiner*—Thu-Nguyet Le
(74) *Attorney, Agent, or Firm*—Richard M. Goldman; Shimokaji & Associates, P.C.

(57) ABSTRACT

Efficiently mining frequent subgraphs contained commonly in a plurality of objects by considering abstraction. A frequent pattern mining apparatus which mines a set of frequent subgraphs contained in a plurality of objects including: a conceptual hierarchy database which stores correspondence between multiple predetermined types of component and a superordinate conceptual element; a mining candidate subgraph generator which generates a set of mining candidate subgraphs using the frequent subgraphs which have already been mined; a weighted support calculator which calculates weighted support of the mining candidate subgraphs; a superordinate concept candidate selector which selects a second mining candidate subgraph to be a superordinate conceptual pattern of a first mining candidate subgraph; and a frequent subgraph adder which adds the second mining candidate subgraph to the set of mining candidate subgraphs if the first mining candidate subgraph and the second mining candidate subgraph are not identical in weighted support.

6 Claims, 9 Drawing Sheets

OTHER PUBLICATIONS

Agrawal, R., & Srikant, R.: Fast Algorithm for Mining Association Rules in Large Databases. Proc. of the 20th VLDB, pp. 487-499, 1994.

Dehaspe, L., Toivonen, H., & King, R. D. Finding frequent substructures in chemical compounds. Proc. of the 4th KDD, pp. 30-36, 1998.

De Raedt, L., & Kramer, S.: The Levelwise Version Space Algorithm and its Application to Molecular Fragment Finding. Proc. of the 17th IJCAI, pp. 853-859, 2001.

Han, J., & Fu, Y.: Discovery of Multiple-Level Association Rules from Large Databases Proc. of VLDB conference, pp. 420-431, 1995.

Inokuchi, I., Washio, T., & Motoda, H.: An Apriori-based Algorithm for Mining Frequent Substructures from Graph Data. Proc. of the 4th PKDD, pp. 12-23, 2000.

Inokuchi, A., Washio, T., Nishimura, Y., & Motoda, H.: A Fast Algorithm for Mining Frequent Connected Subgraphs. IBM Research Report, RT0448, Feb. 2002.

Kuramochi, M., & Karypis, G.: Frequent Subgraph Discovery. Proc. of the 1st ICDM, 2001.

Matsuzawa, H., & Fukuda, T.: Mining Structured Association Patterns from Databases. Proc. of the 4th Pacific-Asia Conference on Knowledge Discovery and Data Mining.

Morimoto, Y.: Algorithm for Counting Frequent Sets in a Space Database, 2nd Data Mining Workshop, pp. 1-10.

Srikant, R., and Agrawal, R.: Mining Generalized Association Rules, Proc. of VLDB conference, pp. 407-419, 1995.

Zaki, M.: Efficiently Mining Frequent Trees in a Forest. Proc. of the 8th International Conference on KDD.

Ramakrishnan Srikant, Rakesh Agrawal, Mining Sequential Patterns: Generalizations And Performance Improvements, Proc. 5th Int. Conf. Extending Database Technology, pp. 3-17, 1996.

\* cited by examiner

| Mining candidate subgraph ID | Size | Mining candidate subgraph | Support | Weighted support |
|---|---|---|---|---|
| x | 18 | 500, 510 | $sup(P_x)$ | $sup_w(P_x)$ |
| x+1 | 18 | 520, 530 | $sup(P_{x+1})$ | $sup_w(P_{x+1})$ |
| ... | ... | ... | ... | ... |

FREQUENT PATTERN MINING APPARATUS, FREQUENT PATTERN MINING METHOD, AND PROGRAM AND RECORDING MEDIUM THEREFOR

BACKGROUND

1. Field of the Invention

The present invention relates to a frequent pattern mining apparatus, frequent pattern mining method, and program and recording medium therefor. More particularly, it relates to a frequent pattern mining apparatus, frequent pattern mining method, and program and recording medium therefor which mine frequent subgraphs contained in many of objects with predetermined characteristics based on analysis results which indicate whether the objects analyzed and represented by graph structures have predetermined characteristics.

2. Background Art

Recently, with the introduction of IT (Information Technology) into various fields, data on substances found in nature, social phenomena, human behavior, etc. has been converted into electronic form. Against this background, attention has been paid to data mining techniques which involve detecting frequent patterns among large volumes of stored data and using the detected patterns effectively for business and science. Methods have been proposed which detect frequent patterns in logs in a fixed format such as relations or POS transactions stored in relational tables (see Non-patent Document 10). An example of such frequent pattern detection methods involves basket analysis (see Non-patent Document 2). Basket analysis methods proposed include those which mine correlation rules or frequent item sets when each item contained in a transaction has a conceptual hierarchy (see Non-patent Documents 5 and 11).

On the other hand, methods have been proposed which detect frequent patterns not only in logs in a fixed format, but also in graph- or tree-structured data. Data mining techniques for graph-structured data include WAMAR (see Non-patent Document 3), AGM (see Non-patent Documents 6 and 7), FSG (see Non-patent Document 8), MolFea (see Non-patent Document 4), etc. Data mining techniques for tree-structured data include Non-patent Document 9, FREQT (see Non-patent Document 1), TreeMiner (see Non-patent Document 12), etc. Also, Non-patent Document 13 proposes a method for mining frequent patterns in sequential data when a conceptual hierarchy at each vertex is provided.

Data mining techniques for detecting frequent patterns in graph-structured or tree-structured data can be applied to various fields including molecular structures of chemical substances, results of natural language parsing, and modification structures in a natural language.

Data mining techniques are described generally in, for example:
1. Tatsuya Asai, Kenji Abe, Shinji Kawasoe, Hiroki Arimura, Hiroshi Sakamoto, Setsuo Arikawa, Efficient Substructure Discovery from Large Semi-structured Data, the Proc. of the Second SIAM International Conference on Data Mining (SDM2002), pp. 158-174, 2002.
2. Agrawal, R., & Srikant, R.: Fast Algorithm for Mining Association Rules in Large Databases. Proc. of the 20th VLDB, pp. 487-499, 1994.
3. Dehaspe, L., Toivonen, H., & King, R. D. Finding frequent substructures in chemical compounds. Proc. of the 4th KDD, pp. 30-36, 1998.
4. De Raedt, L., & Kramer, S.: The Levelwise Version Space Algorithm and its Application to Molecular Fragment Finding. Proc. of the 17th IJCAI, pp. 853-859, 2001.
5. Han, J., & Fu, Y.: Discovery of Multiple-Level Association Rules from Large Databases Proc. of VLDB conference, pp. 420-431, 1995.
6. Inokuchi, I., Washio, T., & Motoda, H.: An Apriori-based Algorithm for Mining Frequent Substructures from Graph Data. Proc. of the 4th PKDD, pp. 12-23, 2000.
7. Inokuchi, A., Washio, T., Nishimura, Y., & Motoda, H.: A Fast Algorithm for Mining Frequent Connected Subgraphs. IBM Research Report, RT0448, February, 2002.
8. Kuramochi, M., & Karypis, G.: Frequent Subgraph Discovery. Proc. of the 1st ICDM, 2001.
9. Matsuzawa, H., & Fukuda, T.: Mining Structured Association Patterns from Databases. Proc. of the 4th Pacific-Asia Conference on Knowledge Discovery and Data Mining.
10. Morimoto, Y.: Algorithm for Counting Frequent Sets in a Space Database, 2nd Data Mining Workshop, pp. 1-10.
11. Srikant, R., and Agrawal, R.: Mining Generalized Association Rules, Proc. of VLDB conference, pp. 407-419, 1995.
12. Zaki, M.: Efficiently Mining Frequent Trees in a Forest. Proc. of the 8th International Conference on KDD.
13. Ramakrishnan Srikant, Rakesh Agrawal, Mining Sequential Patterns: Generalizations And Performance Improvements, Proc. 5th Int. Conf. Extending Database Technology, pp. 3-17, 1996.

The graph mining and tree mining described above are techniques which extend objects of basket analysis to graph-structured data. Specifically, the vertices and edges of a graph are made to correspond to items while vertex labels and edge labels are made to correspond to types of item. When mining frequent patterns by introducing a concept of hierarchy into labels, the following problem arises.

Graph data, which has two or more vertices and edges with the same label, contains huge numbers of frequent patterns and candidates compared to an item set. Furthermore, if patterns in which labels represented by superordinate concepts and labels represented by subordinate concepts are generated as candidates for frequent patterns, frequent pattern candidates to be matched with the same subgraph are generated by substituting different vertex labels or edge labels with superordinate concepts. This means huge numbers of frequent pattern candidates, which are impossible to implement.

Thus, a need exists to provide a frequent pattern mining apparatus, frequent pattern mining method, and program and recording medium therefor which can solve the above problems.

SUMMARY OF THE INVENTION

In a first aspect, the present invention provides a frequent pattern mining apparatus which mines a set of frequent subgraphs contained in objects which have a ratio not lower than a predetermined minimum ratio from among a plurality of objects represented by graph structures, wherein: each of the plurality of objects is represented by a graph structure which has a plurality of vertices and a plurality of edges contained in the object as components, the frequent pattern mining apparatus comprising: a conceptual hierarchy database which stores correspondence between multiple predetermined types of component and a superordinate conceptual element matched with each of the multiple types of component; a mining candidate subgraph generator which generates a set of mining candidate subgraphs by adding the components or the superordinate conceptual element to the frequent subgraphs which have already been mined; a weighted support calculator which calculates weighted support by totaling the number of subgraphs matched with the mining candidate subgraphs in each of the plurality of objects; a superordinate concept candidate selector which selects a second mining candidate subgraph which becomes identical to a first mining candidate subgraph when a component contained in the first mining candidate subgraph is substituted with the superordinate conceptual element matched with the component; and a frequent subgraph adder which adds the second mining candidate subgraph to the set of mining candidate subgraphs if first weighted support which is the weighted support of the first mining candidate subgraph is not identical to second weighted support which is the weighted support of the second mining candidate subgraph.

The present invention makes it possible to efficiently mine frequent subgraphs contained in a plurality of objects represented by graph structures by considering abstracting part of vertices or edges.

Incidentally, the above summary of the invention does not enumerate all the necessary features of the present invention, and subcombinations of above features can also constitute inventions.

THE FIGURES

Various examples of the invention are illustrated in the figures appended hereto.

FIG. 5 shows an example of information stored in a mining candidate subgraph DB 155 according the embodiment of the present invention;

DETAILED DESCRIPTION

The present invention will be described below by way of an embodiment of the invention, but the embodiment below is not intended to limit the claimed invention and a combination of all the features described in the embodiment is not necessarily essential for the solution of the invention.

Figure 1:
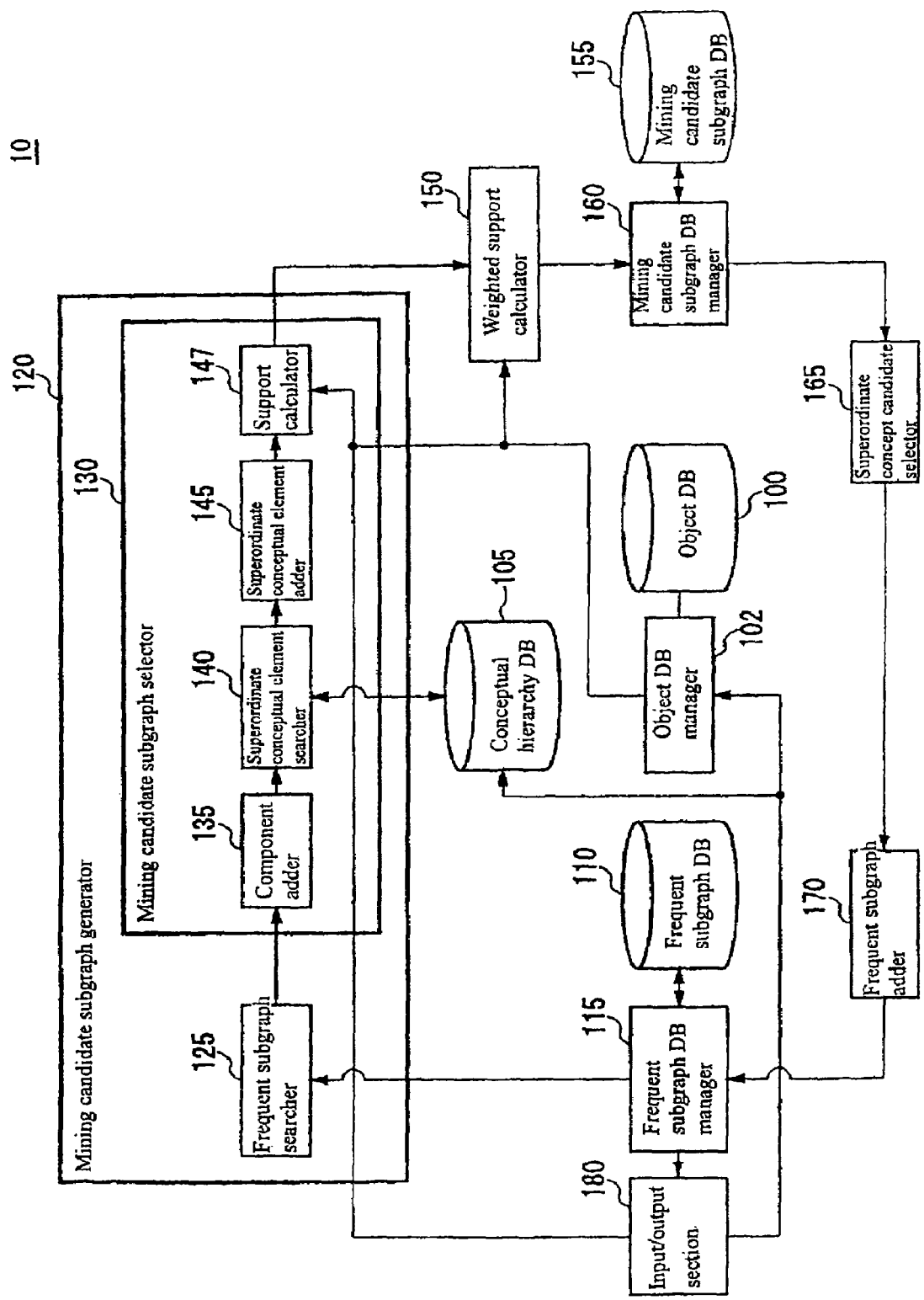
FIG. 1 shows a frequent pattern mining apparatus 10 according to an embodiment of the present invention.

FIG. 1 shows a frequent pattern mining apparatus 10 according to this embodiment. The frequent pattern mining apparatus 10 mines a set of frequent subgraphs contained in objects which have a ratio not lower than a predetermined minimum ratio from among a plurality of objects to be analyzed, each of which is represented by a graph structure. Each of these objects has been selected based on analysis results which indicate whether the object has predetermined characteristics. It is represented by a graph structure or a tree structure which has a plurality of vertices and a plurality of edges contained in the object as components.

These objects may be natural objects such as molecular structures represented by graph structures. Alternatively, they may be, for example, graph structure representations of data structures such as browsing sequences of Web pages viewed by the user accessing the Internet, parse trees of natural languages, etc.

An object DB 100 stores a plurality of objects represented by graph structures and having predetermined characteristics. An object DB manager 102 manages the object DB 100 and returns graph data of objects stored in the object DB 100 in response to a request from a support calculator 147 of a mining candidate subgraph generator 120 or from a weighted support calculator 150.

A conceptual hierarchy DB 105 stores correspondence between multiple predetermined types of component and a superordinate conceptual element matched with each of the multiple types of component.

A frequent subgraph DB 110 stores a set of frequent subgraphs contained in objects which have a ratio not lower than a predetermined minimum ratio from among a plurality of objects stored in the object DB 100 by associating the frequent subgraphs with size values determined based on the number of the components contained in the respective frequent subgraphs. An index which represents the predetermined minimum ratio is referred to as a minimum support and is determined by the user or the like as a minimum value of the support described in Definition 6 in Supplementary Explanation. A frequent subgraph DB manager 115 manages the frequent subgraph DB 110 and supplies frequent subgraphs stored in the frequent subgraph DB 110 to the mining candidate subgraph generator 120 in response to a request from the mining candidate subgraph generator 120. Also, the frequent subgraph DB manager 115 stores newly generated frequent subgraphs in the frequent subgraph DB 110 in response to a request from a frequent subgraph adder 170.

The mining candidate subgraph generator 120 generates components or superordinate conceptual elements as a set of frequent subgraphs in an initial state in which no frequent subgraph has been mined. In non-initial states, the mining candidate subgraph generator 120 acquires mined frequent subgraphs from the frequent subgraph DB 110 and generates a set of mining candidate subgraphs by adding components or a superordinate conceptual element to the frequent subgraphs. The mining candidate subgraph generator 120 comprises a frequent subgraph searcher 125 and mining candidate subgraph selector 130.

The frequent subgraph searcher 125 searches the frequent subgraph DB 110 via the frequent subgraph DB manager 115 using a first size as a search key and retrieves frequent subgraphs of the first size from the frequent subgraph DB 110. The mining candidate subgraph selector 130 selects subgraphs of a second size larger than the first size as the mining candidate subgraphs, where the subgraphs of the second size are produced by adding a component or superordinate conceptual element to the retrieved frequent subgraphs. The mining candidate subgraph selector 130 according to this embodiment selects mining candidate subgraphs whose support is not lower than the minimum support. The support here is an index which represents a ratio of objects containing subgraphs to be matched with a given subgraph. It is prescribed, for example, by Definition 6 in Supplementary Explanation.

The mining candidate subgraph selector 130 comprises a component adder 135 which generates a frequent graph candidate by adding one component to one frequent subgraph which has already been mined, a superordinate conceptual element searcher 140 which searches the conceptual hierarchy DB 105 for one superordinate conceptual element matched with the one component using the one component as a search key, a superordinate conceptual element adder 145 which generates a mining candidate subgraph by adding the one superordinate conceptual element to the one frequent subgraph, and the support calculator 147 which calculates the support of the generated mining candidate subgraph. The mining candidate subgraph selector 130 generates a subgraph by adding a component to a mined frequent subgraph via the component adder 135 or adding a superordinate conceptual element to the mined frequent subgraph via the superordinate conceptual element adder 145, and selects the generated subgraph as a mining candidate subgraph if the support of the generated subgraph as calculated by the support calculator 147 is not lower than the minimum support.

The weighted support calculator 150 calculates weighted support of each mining candidate subgraph generated by the mining candidate subgraph generator 120. More specifically, the weighted support calculator 150 acquires objects one after another from the object DB 100 via the object DB manager 102 and counts the number of subgraphs contained in each object and matched with the mining candidate subgraphs. Then, the weighted support calculator 150 totals the counts in all the objects to calculates the weighted support. The weighted support here is the total number of subgraphs matched with mining candidate subgraphs in all objects. It is prescribed, for example, by Definition 7 in Supplementary Explanation.

A mining candidate subgraph DB 155 stores the mining candidate subgraphs received from the weighted support calculator 150, the support of the mining candidate subgraphs calculated by the support calculator 147, and the weighted support of the mining candidate subgraphs calculated by the weighted support calculator 150, by associating them with each other. A mining candidate subgraph DB manager 160 manages the mining candidate subgraph DB 155. It acquires mining candidate subgraphs, the support of the mining candidate subgraphs, and the weighted support of the mining candidate subgraphs from the weighted support calculator 150 and stores them in the mining candidate subgraph DB 155.

A superordinate concept candidate selector 165 acquires mining candidate subgraphs from the mining candidate subgraph DB 155 via the mining candidate subgraph DB manager 160 and supplies them to the frequent subgraph adder 170 together with their support and weighted support stored by being associated with the mining candidate subgraphs. In so doing, if the weighted support of a first mining candidate subgraph and the weighted support of a second mining candidate subgraph are identical and if the second mining candidate subgraph provides a superordinate conceptual pattern for the first mining candidate subgraph, the superordinate concept candidate selector 165 selects the second mining candidate subgraph as an overly abstracted mining candidate subgraph and supplies it to the frequent subgraph adder 170 together with information which indicates the excessive abstraction.

The frequent subgraph adder 170 adds the mining candidate subgraph supplied from the superordinate concept candidate selector 165 to the set of frequent subgraphs by storing it in the frequent subgraph DB 110 via the frequent subgraph DB manager 115. The candidate subgraph selected by the superordinate concept candidate selector 165 as being overly abstracted is removed from the set of frequent subgraphs without being stored in the frequent subgraph DB 110. Consequently, the frequent subgraph adder 170 adds the second mining candidate subgraph to the set of frequent subgraphs, provided that first weighted support which is the weighted support of a corresponding first mining candidate subgraph is not identical to second weighted support which is the weighted support of the second mining candidate subgraph. Regarding the first mining candidate subgraph, since one with a support not lower than the minimum support has been selected by the mining candidate subgraph generator 120, it is added to the set of frequent subgraphs by the frequent subgraph adder 170.

An input/output section 180 is fed a plurality of objects in which frequent subgraphs are mined as well as correspondence between components and a superordinate conceptual element, which are entered by the user of the frequent pattern mining apparatus 10 or supplied from another information processing unit or the like, and stores them in the object DB 100 and conceptual hierarchy DB 105. Also, the input/output section 180 is fed the minimum support of the frequent subgraphs to be mined, which is entered by the user of the frequent pattern mining apparatus 10 or supplied from the other information processing unit or the like, and supplies it to the component adder 135 or superordinate conceptual element adder 145 in the mining candidate subgraph generator 120. When the frequent pattern mining apparatus 10 finishes mining frequent subgraphs, the input/output section 180 acquires the mined frequent subgraphs from the object DB 100 via the frequent subgraph DB manager 115 and outputs them to the user of the frequent pattern mining apparatus 10 or to the other information processing unit or the like.

In the frequent pattern mining apparatus 10 described above, the frequent subgraph adder 170 adds the second mining candidate subgraph to the set of frequent subgraphs, provided that the first mining candidate subgraph is added to the set of frequent subgraphs and that the first weighted support and the second weighted support are not identical. Consequently, the frequent subgraph adder 170 does not store a second mining candidate subgraph which is a superordinate conceptual pattern of the first mining candidate subgraph and which has the same support as the first mining candidate subgraph in the frequent subgraph DB 110. According to Theorem 3 in Supplementary Explanation provided later, if a second mining candidate subgraph is a superordinate conceptual pattern of a first mining candidate subgraph and if first weighted support and second weighted support are identical, all subgraphs generated by isomorphically extending the first mining candidate subgraph and second mining candidate subgraph have the same support. Therefore, by removing second mining candidate subgraphs which satisfy these conditions in the course of searches, and thus removing overly abstracted mining candidate subgraphs defined in Definition 9 in Supplementary Explanation provided later, the frequent subgraph adder 170 can prune large search space. This allows the frequent pattern mining apparatus 10 to mine frequent subgraphs efficiently.

Figure 2:
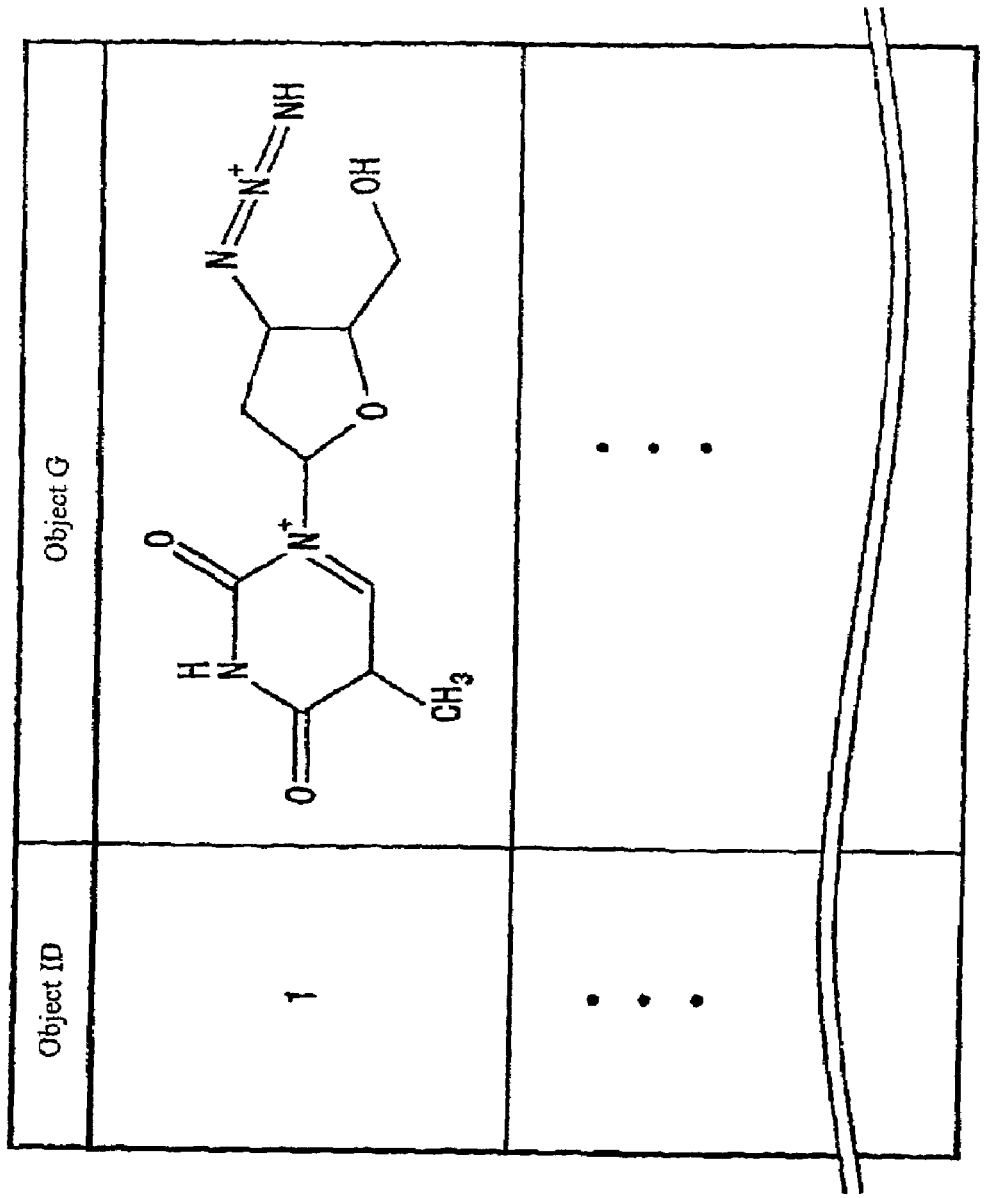
FIG. 2 shows an example of information stored in an object DB 100 according to the embodiment of the present invention.

FIG. 2 shows an example of information stored in the object DB 100 according to this embodiment. The object DB 100 stores graph data on a plurality of objects by associating it with object IDs (identifiers: identification information) which identify the respective objects.

According to this embodiment, each of the plurality of objects is a chemical substance which has been selected based on experimental analysis results which indicate that the chemical substance provides predetermined medicinal benefits, an example of the predetermined characteristics. In each of the plurality of objects, a plurality of vertices correspond to a plurality of atoms and a plurality of edges correspond to links among the plurality of atoms.

The object DB 100 according to this embodiment stores a plurality of objects as graph data which represent molecular structures of the objects by graph structures based on experimental analysis results which indicate that the objects have HIV (Human Immunodeficiency Virus) resistance as medicinal benefits. For example, as an object which has HIV resistance, the object DB 100 stores azidothymidine confirmed by the analysis to have HIV resistance, by associating it with an object ID 1.

Figure 3:
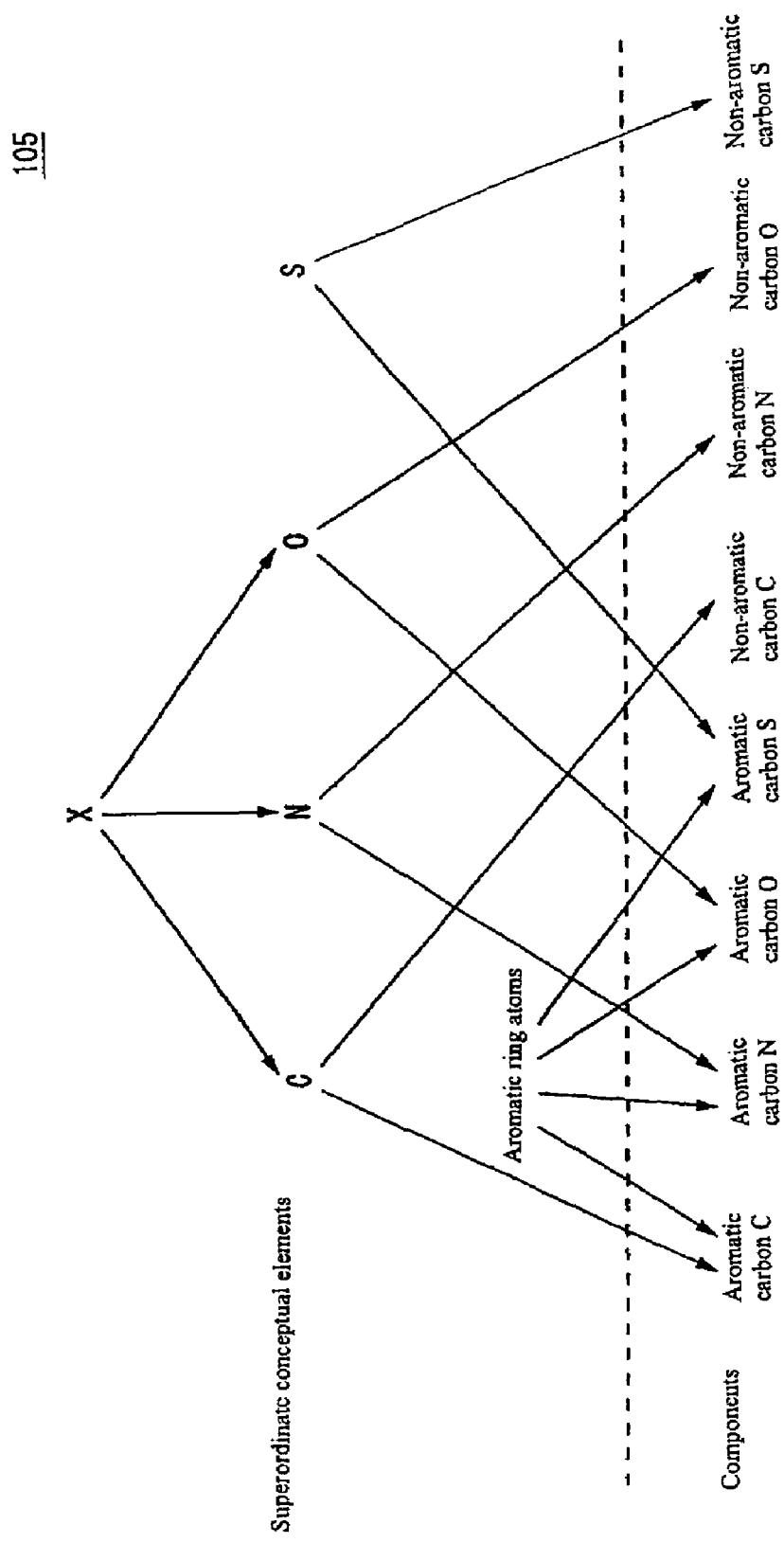
FIG. 3 shows an example of information stored in a conceptual hierarchy DB 105 according the embodiment of the present invention.

FIG. 3 shows an example of information stored in the conceptual hierarchy DB 105 according to this embodiment. As an example of correspondence between multiple predetermined types of component and a superordinate conceptual element, the conceptual hierarchy DB 105 according to this embodiment stores correspondence between multiple predetermined types of atom and a conceptually higher atom matched with each of the multiple types of atom.

For example, the conceptual hierarchy DB 105 stores correspondence between components of a plurality of objects—carbon atoms in aromatic rings (aromatic carbons) and carbon atoms in non-aromatic rings (non-aromatic carbons)—and a superordinate conceptual element, the carbon atom (C). If a mining candidate subgraph contains a carbon atom, which is a superordinate conceptual element, the mining candidate subgraph is matched with both object which contains a subgraph in which an aromatic carbon is the superordinate conceptual element and object which contains a subgraph in which a non-aromatic carbon is the superordinate conceptual element.

Also, using each of multiple types of superordinate conceptual element as a component, the conceptual hierarchy DB 105 may store correspondence between the multiple types of superordinate conceptual element and another superordinate conceptual element matched with each of the multiple types of superordinate conceptual element. For example, using the carbon atom C, nitrogen atom N, and oxygen atom O which are superordinate conceptual elements as components, the conceptual hierarchy DB 105 may store correspondence between these types of component and a superordinate conceptual element X matched with each of these types of component.

Also, the conceptual hierarchy DB 105 may further store correspondence of one component to a first superordinate conceptual element and second superordinate conceptual element matched with this component. For example, the conceptual hierarchy DB 105 may further store correspondence between an aromatic carbon and the carbon atom C which is a first superordinate conceptual element matched with the aromatic carbon as well as correspondence between the aromatic carbon and an aromatic ring atom which is a second superordinate conceptual element matched with the aromatic carbon.

As described above, the conceptual hierarchy DB 105 according to this embodiment stores correspondence between multiple types of vertex and a superordinate conceptual element matched with each of these types of vertex. Alternatively, it may store correspondence between multiple types of edge and a superordinate conceptual element matched with each of these types of edge.

Figure 4:
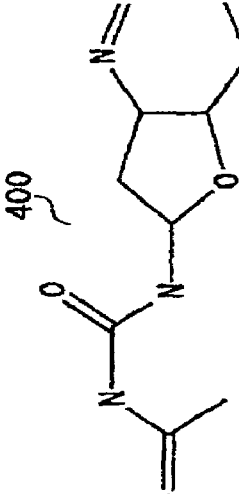
FIG. 4 shows an example of information stored in a frequent subgraph DB 110 according the embodiment of the present invention.

FIG. 4 shows an example of information stored in the frequent subgraph DB 110 according to this embodiment. According to this embodiment, the frequent subgraph DB 110 stores the frequent subgraphs which are contained in the plurality of objects stored in the object DB 100 and whose support is not lower than minimum support, by associating the frequent subgraphs with frequent subgraph IDs which identify the respective frequent subgraphs as well as their sizes, supports, and weighted supports.

A size field of a frequent subgraph contains, for example, a value determined based on the number of components as defined in Definition 1 in Supplementary Explanation provided later. For example, a frequent subgraph 400 stored by being associated with a frequent subgraph ID x has 17 atoms as its components and is assigned a size of 17. Alternatively, the size of a frequent subgraph may be determined based on the number of edges, sum total of vertices and edges, etc.

A support field of the frequent subgraph contains support $\sup(Gs_x)$ calculated for the frequent subgraph by the support calculator 147. A weighted support field of the frequent subgraph contains weighted support $\sup_w(Gs_x)$ calculated for the frequent subgraph by the weighted support calculator 150.

In the frequent pattern mining apparatus 10, the frequent subgraph adder 170 stores the mining candidate subgraphs generated by the mining candidate subgraph generator 120 in the frequent subgraph DB 110. Consequently, the frequent subgraph adder 170 adds a second mining candidate subgraph to be a superordinate conceptual pattern of a first mining candidate to the set of frequent subgraphs, provided that the weighted support of the first mining candidate subgraph is not identical to the weighted support of the second mining candidate subgraph. Thus, by removing overly abstracted mining candidate subgraphs in the course of searches, the frequent subgraph adder 170 can efficiently generate a set of substructures contained commonly in chemical substances.

FIG. 5 shows an example of information stored in the mining candidate subgraph DB 155 according to this embodiment. According to this embodiment, the mining candidate subgraph DB 155 stores the mining candidate subgraphs generated by the mining candidate subgraph generator 120 by associating them with their support calculated by the support calculator 147 and their weighted support calculated by the weighted support calculator 150.

A size field, support field, and weighted support field of a mining candidate subgraph contains a size, support, and weighted support of the mining candidate subgraph which are determined in a manner similar to the size, support, and weighted support of a frequent subgraph described with reference to FIG. 4.

A mining candidate subgraph 500 and mining candidate subgraph 520 are generated by the mining candidate subgraph generator 120 and stored in the mining candidate subgraph DB 155. That is, the mining candidate subgraph generator 120 generates a set of mining candidate subgraphs such as the mining candidate subgraph 500 and mining candidate subgraph 520 by adding an atom or a conceptually higher atom to frequent subgraphs already mined as substructures of chemical substances which provide predetermined benefits.

More specifically, the frequent subgraph searcher 125 searches the frequent subgraph DB 110 for the frequent subgraph 400 with a size of 17 which is an example of the first size and the component adder 135 generates the mining candidate subgraph 500 by adding a component 510 to the retrieved frequent subgraph 400. The superordinate conceptual element searcher 140 searches the conceptual hierarchy DB 105 for a superordinate conceptual element 530 to be matched with the component 510 and the superordinate conceptual element adder 145 generates the mining candidate subgraph 520 by adding the superordinate conceptual element 530 to the retrieved frequent subgraph 400. Consequently, the mining candidate subgraph 520 becomes a superordinate conceptual pattern of the mining candidate subgraph 500. The above processes allow the mining candidate subgraph selector 130 to select the mining candidate subgraph 500 and mining candidate subgraph 520 which are subgraphs with a second size of 18 larger than the first size of 17.

Figure 6:
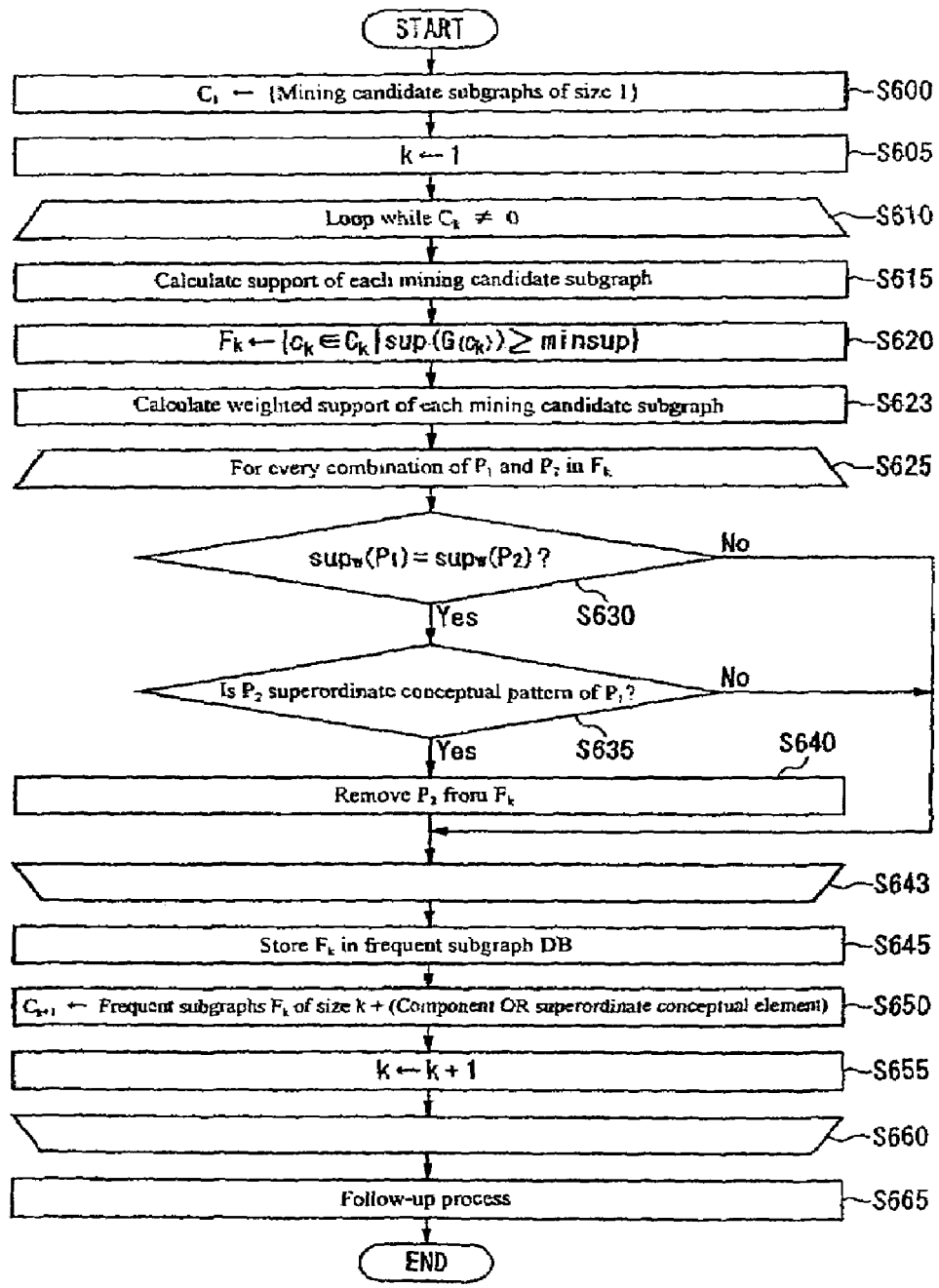
FIG. 6 shows an operation flow of the frequent pattern mining apparatus 10 according the embodiment of the present invention.

FIG. 6 shows an operation flow of the frequent pattern mining apparatus 10 according to this embodiment.

Before mining of frequent subgraphs is started, the input/output section 180 is fed a plurality of objects from the object DB 100 via the object DB manager 102. Also, the input/output section 180 is fed correspondence between components and superordinate conceptual elements and stores it in the conceptual hierarchy DB 105. Furthermore, the input/output section 180 is fed the minimum support of the frequent subgraphs to be mined and supplies it to the support calculator 147. The frequent pattern mining apparatus 10 starts mining the frequent subgraphs after making sure that no frequent subgraph is stored in the frequent subgraph DB 110.

When mining of frequent subgraphs is started, the mining candidate subgraph generator 120 generates one or more mining candidate subgraphs of size 1 and makes the mining candidate subgraph DB manager 160 store them in the mining candidate subgraph DB 155 via the weighted support calculator 150 (Step S600).

More specifically, since no frequent subgraph is stored in the frequent subgraph DB 110, the component adder 135 generates each of the one or more mining candidate subgraphs as a subgraph of size 1. In relation to each of the one or more mining candidate subgraphs generated by the component adder 135, the superordinate conceptual element searcher 140 searches the conceptual hierarchy DB 105 for a superordinate conceptual element to be matched with components which constitute the mining candidate subgraph. The superordinate conceptual element adder 145 generates each of the one or more superordinate conceptual element adder found by the superordinate conceptual element searcher 140, as a mining candidate subgraph of size 1.

Next, beginning with a set $C_1$ of mining candidate subgraphs with a size of k=1 (S605), the frequent pattern mining apparatus 10 generates a set $F_k$ of frequent subgraphs with a size of k from a set $C_k$ of mining candidate subgraphs with a size of k, generates a set $C_{k+1}$ of mining candidate subgraphs with a size of k+1 from the set $F_k$ of frequent subgraphs, and so on (S610, S660).

From a set $F_{k-1}$ of frequent subgraphs with a first size of k−1, the support calculator 147 calculates support sup(G ($c_k$)) of each mining candidate subgraph $c_k$ contained in the set $C_k$ of mining candidate subgraphs generated by the component adder 135 or superordinate conceptual element adder 145 (S615). Then, the support calculator 147 selects subgraphs whose support sup(G($c_k$)) is equal to or higher than minimum support minsup, removing subgraphs which do not satisfy the minimum support minsup, and outputs the set $F_k$ of mining candidate subgraphs to be stored in the mining candidate subgraph DB 155 (S620).

The weighted support calculator 150 calculates the weighted support of each mining candidate subgraph of a second size k outputted from the support calculator 147 (S623). Then, the weighted support calculator 150 stores the mining candidate subgraphs in the mining candidate subgraph DB 155 by associating them with their respective supports and weighted supports. Alternatively, the weighted support calculator 150 may go through S615 to calculate the weighted support of every mining candidate subgraph $c_k$ contained in the set $C_k$ of mining candidate subgraphs generated by the component adder 135 or the superordinate conceptual element adder 145 and then go through S620 to output the set $F_k$ of mining candidate subgraphs to be stored in the mining candidate subgraph DB 155.

Next, the superordinate concept candidate selector 165 and frequent subgraph adder 170 perform the following processes on each combination of two mining candidate subgraphs $P_1$ and $P_2$ in the set $F_k$ of mining candidate subgraphs which have the size of k and are stored in the mining candidate subgraph DB 155 (S625, S643).

First, if first weighted support $sup_w(P_1)$ which is the weighted support of the first mining candidate subgraph $P_1$ is not identical to second weighted support $sup_w(P_2)$ which is the weighted support of the second mining candidate subgraph $P_2$, the superordinate concept candidate selector 165 finishes processing the first mining candidate subgraph $P_1$ and second mining candidate subgraph $P_2$ and starts processing a next combination (S630: No).

When the first weighted support $sup_w(P_1)$ and second weighted support $sup_w(P_2)$ are identical (S630: Yes), if the second mining candidate subgraph $P_2$ is not a superordinate conceptual pattern of the first mining candidate subgraph $P_1$, the superordinate concept candidate selector 165 finishes processing the first mining candidate subgraph $P_1$ and second mining candidate subgraph $P_2$ and starts processing a next combination (S635: No).

If the second mining candidate subgraph $P_2$ is a superordinate conceptual pattern of the first mining candidate subgraph $P_1$ (S635: Yes), the superordinate concept candidate selector 165 selects the second mining candidate subgraph $P_2$ as an overly abstracted mining candidate subgraph. The second mining candidate subgraph $P_2$ being a superordinate conceptual pattern of the first mining candidate subgraph $P_1$ means that the first mining candidate subgraph $P_1$ remains the same even if a component of it is substituted with a superordinate conceptual element matched with this component.

Next, the frequent subgraph adder 170 acquires a set $F_k$ of mining candidate subgraphs with a second size via the mining candidate subgraph DB manager 160 and superordinate concept candidate selector 165. Then, the frequent subgraph adder 170 removes the second mining candidate subgraph $P_2$ selected by the superordinate concept candidate selector 165 as being overly abstracted for a first mining candidate subgraph $P_1$ from the set $F_k$ of mining candidate subgraphs (S640). Consequently, since the first weighted support $sup_w(P_1)$ of the first mining candidate subgraph $P_1$ and the second weighted support $sup_w(P_2)$ of the second mining candidate subgraph $P_2$ are identical, the frequent subgraph adder 170 removes the second mining candidate subgraph $P_2$, which is a superordinate conceptual pattern of the first mining candidate subgraph $P_1$, from the set $F_k$ of mining candidate subgraphs.

Then, the frequent subgraph adder 170 stores the set $F_k$ of mining candidate subgraphs obtained as a result of the processes in S625 to S643 except the second mining candidate subgraph $P_2$ in the frequent subgraph DB 110 by associating them with the size k of the mining candidate subgraphs, support $\sup(P_1)$ and/or $\sup(P_2)$, and weighted support $\sup_w(P_1)$ and/or $\sup_w(P_2)$ (S645). Thus, the frequent subgraph adder 170 adds the second mining candidate subgraph $P_2$ which is a superordinate conceptual pattern of the first mining candidate subgraph $P_1$ to the set of mining candidate subgraphs only if the first weighted support $\sup_w(P_1)$ of the first mining candidate subgraph $P_1$ and the second weighted support $\sup_w(P_2)$ of the second mining candidate subgraph $P_2$ are not identical.

Next, the mining candidate subgraph generator 120 generates mining candidate subgraphs of a second size k+1 larger than the first size k from the mining candidate subgraphs of the first size and makes the mining candidate subgraph DB manager 160 store them in mining candidate subgraph DB via the weighted support calculator 150 (S650).

More specifically, the component adder 135 searches the frequent subgraph DB 110 for one or more frequent subgraphs of the first size k. Then, the component adder 135 generates a frequent graph candidate by adding one component to one retrieved frequent subgraph. Then, using this component as a search key, the superordinate conceptual element searcher 140 searches the conceptual hierarchy DB 105 for a superordinate conceptual element to be matched with the component. Then, the superordinate conceptual element adder 145 generates a mining candidate subgraph by adding one superordinate conceptual element found by the superordinate conceptual element searcher 140 to the frequent subgraph. Consequently, the mining candidate subgraph generator 120 generates a set $C_{k+1}$ of mining candidate subgraphs with the second size k+1.

The frequent pattern mining apparatus 10 increments the size of the mining candidate subgraph processed (S655). It repeats the processes of S610 to S660 (S660) until no mining candidate subgraph is newly generated any more. After repeating the processes of S610 to S660, the frequent pattern mining apparatus 10 performs a follow-up process in which it removes the overly abstracted frequent subgraphs which has not been pruned in the course of searches, from the frequent subgraph DB 110 (S665).

In the frequent pattern mining apparatus 10 described above, the frequent subgraph adder 170 adds the second mining candidate subgraph to a set of frequent subgraphs if the first mining candidate subgraph is added to the set of frequent subgraphs and if the first weighted support and second weighted support are not identical. Consequently, when subsequent mining candidate subgraphs are extended isomorphically in the course of searches, the frequent pattern mining apparatus 10 can prune any second mining candidate subgraph that is an overly abstracted superordinate conceptual pattern of the corresponding first mining candidate subgraph.

In S643 above, in addition to the pruning of the second mining candidate subgraph, the frequent pattern mining apparatus 10 may perform pruning as follows. Specifically, in addition to the process of S643, the superordinate concept candidate selector 165 further selects a third mining candidate subgraph which is different from the first mining candidate subgraph but becomes identical to the second mining candidate subgraph when a component contained in the first mining candidate subgraph is substituted with a superordinate conceptual element matched with the component. Then, if second weighted support is identical to third weighted support which is the weighted support of the third mining candidate subgraph and if the set of subgraphs matched with the second mining candidate subgraph in each of a plurality of objects are identical to the set of subgraphs matched with the third mining candidate subgraph in each of the plurality of objects, the frequent subgraph adder 170 adds the second mining candidate subgraph, but not the third mining candidate subgraph, to the set of frequent subgraphs, provided that the first weighted support and second weighted support are not identical.

By adding the above process, the frequent pattern mining apparatus 10 can remove any redundant superordinate conceptual pattern of the first mining candidate subgraph in the course of searches, making it possible to mine frequent subgraphs more efficiently.

Figure 7:
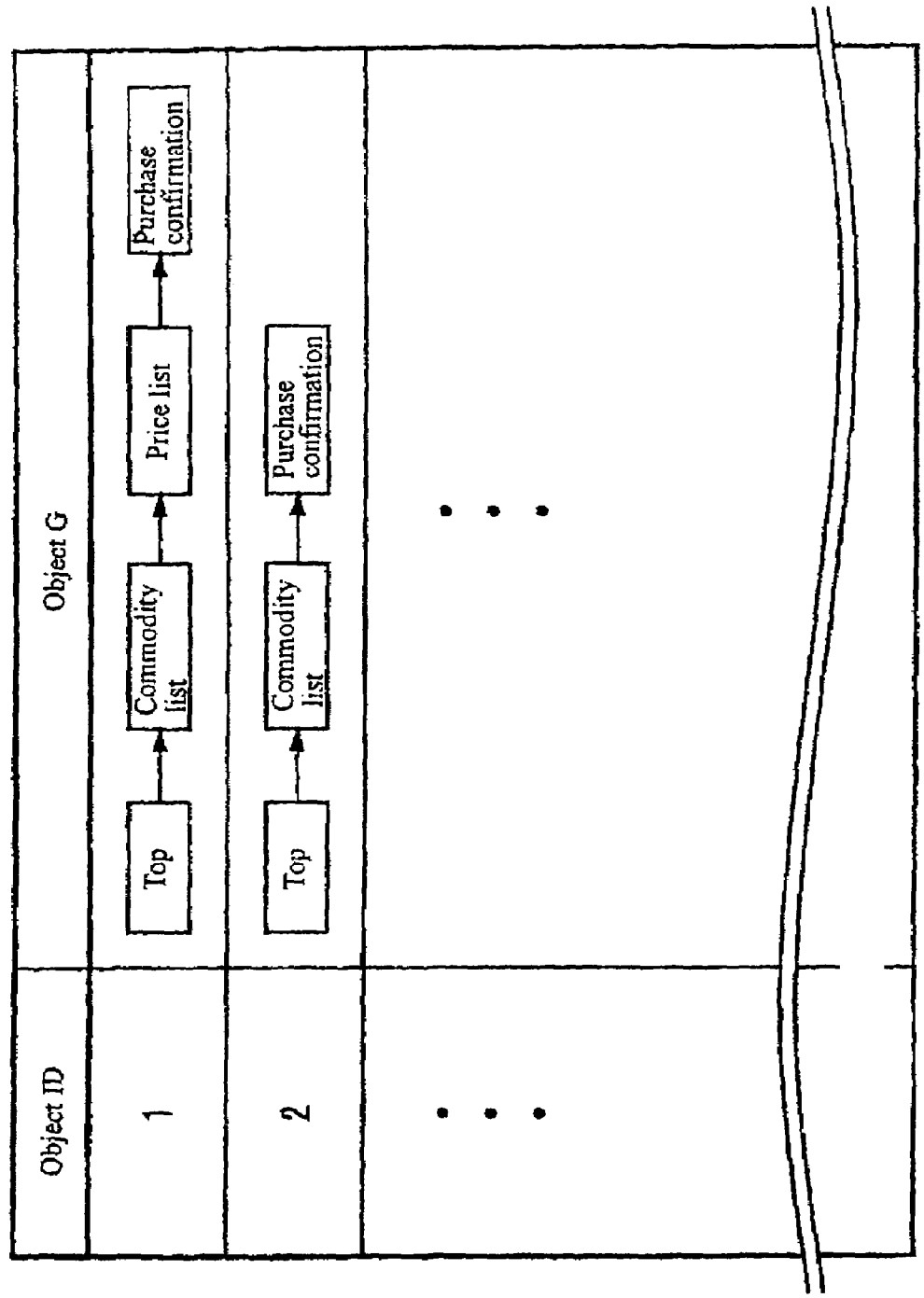
FIG. 7 shows an example of information stored in an object DB 100 according to a first variation of the embodiment of the present invention.

FIG. 7 shows an example of information stored in an object DB 100 according to a first variation of this embodiment. A frequent pattern mining apparatus 10 according to this variation is almost the same as the frequent pattern mining apparatus 10 shown in FIG. 1, and thus description thereof will be omitted except for differences.

Each of the plurality of objects which have predetermined characteristics and are stored in the object DB 100 according to the first variation is a World Wide Web site browsing history in which the plurality of vertices correspond to a plurality of browsed Web pages and the plurality of edges correspond to a browsing sequence of Web pages. The conceptual hierarchy DB 105 stores correspondence between multiple predetermined types of Web page and a conceptually higher Web page matched with each of the multiple types of Web page as correspondence between the multiple types of component and the superordinate conceptual element matched with each of the multiple types of component.

The object DB 100 may store a browsing history with predetermined characteristics, for example, when the user takes a predetermined action after browsing one or more Web pages in sequence. The predetermined action here may consist of accessing a Web page or purchasing a commodity, service, or the like via a Web page.

The mining candidate subgraph generator 120 generates a set of mining candidate subgraphs by adding a Web page which is a component or by adding a conceptually higher Web page which is a superordinate conceptual element to frequent subgraphs already mined as substructures of browsing histories which have predetermined characteristics. The frequent subgraph searcher 125 and mining candidate subgraph selector 130 perform the processes in FIGS. 1 to 6 using Web pages as components and a conceptually higher Web page as a superordinate conceptual element.

The weighted support calculator 150 calculates weighted support which is the total number of subgraphs matched with mining candidate subgraphs in all objects. The superordinate concept candidate selector 165 selects a second mining candidate subgraph which becomes identical in substructure to a first mining candidate subgraph—i.e., second mining candidate subgraph which is to become a superordinate conceptual pattern of the first mining candidate subgraph—when a Web page which is a component contained in the first mining candidate subgraph is substituted with a conceptually higher Web page which is a superordinate conceptual element matched with the Web page. The frequent subgraph adder 170 adds the second mining candidate subgraph to a set of frequent subgraphs, and thereby generates a set of frequent subgraphs which is a substructure contained commonly in browsing histories with predetermined characteristics, provided that the weighted support of the first mining candidate subgraph and the weighted support of the second mining candidate subgraph are not identical.

The frequent pattern mining apparatus 10 according to the first variation can mine a set of frequent subgraphs, i.e., subgraphs of browsing sequences contained in the browsing histories which satisfy minimum support, out of a plurality of browsing histories with predetermined characteristics. Consequently, the frequent pattern mining apparatus 10 can mine browsing sequences which are related to particular actions of users and can support World Wide Web-based marketing and the like.

Figure 8:
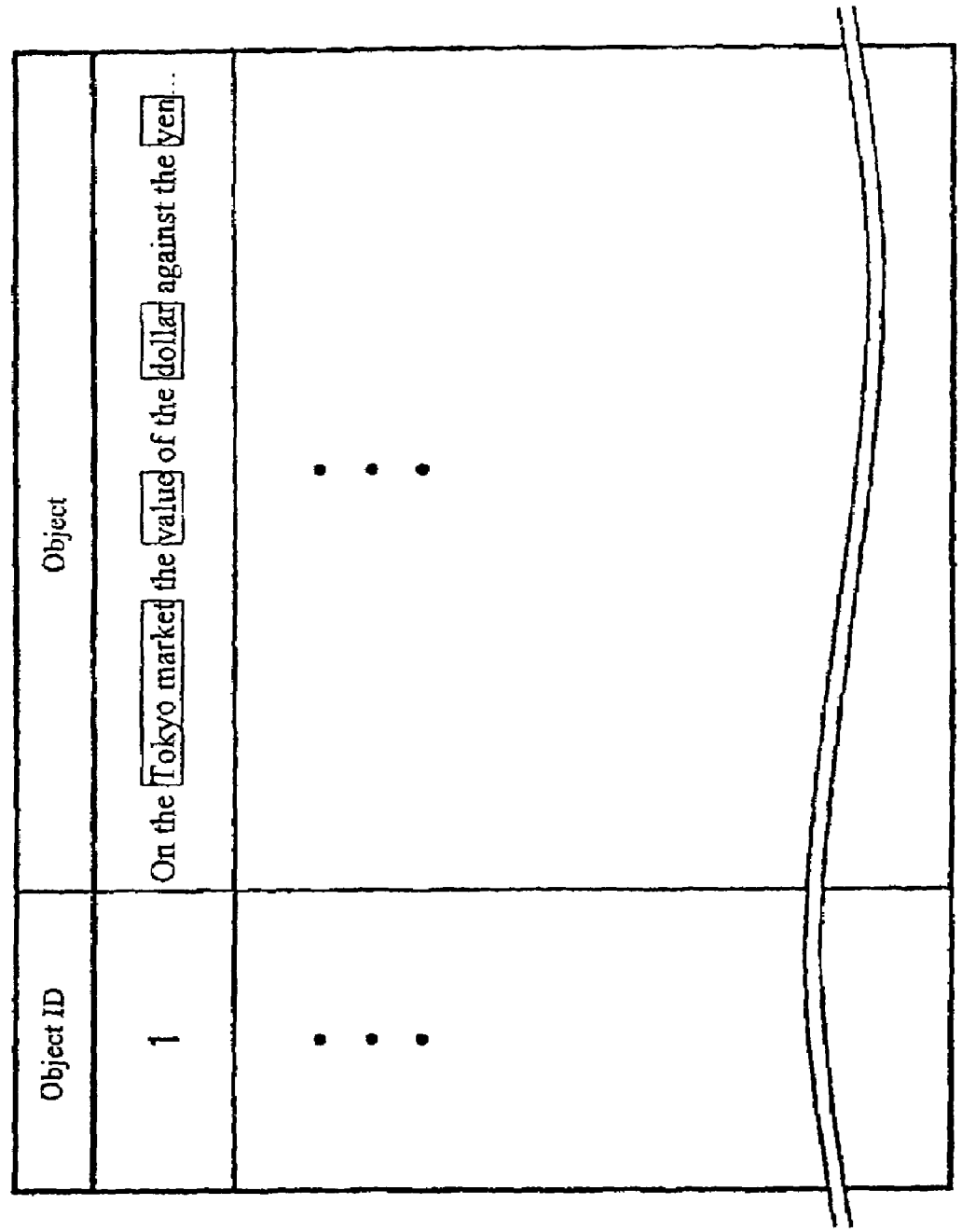
FIG. 8 shows an example of information stored in an object DB 100 according to a second variation of the embodiment of the present invention.

FIG. 8 shows an example of information stored in an object DB 100 according to a second variation of this embodiment. A frequent pattern mining apparatus 10 according to this variation is almost the same as the frequent pattern mining apparatus 10 shown in FIG. 1, and thus description thereof will be omitted except for differences.

Each of the plurality of objects which have predetermined characteristics and are stored in the object DB 100 according to the second variation is an object which represents a sentence in which the plurality of vertices correspond to a plurality of words/phrases and the plurality of edges correspond to ordering of the plurality of words/phrases. Each sentence is selected based on analysis results which indicate that the sentence should belong to a predetermined genre such as politics, economics, literature, sports, etc. The conceptual hierarchy DB 105 stores correspondence between multiple predetermined types of word/phrase and a conceptually higher word/phrase matched with each of the multiple types of component as correspondence between the multiple types of component and the superordinate conceptual element matched with each of the multiple types of component.

The mining candidate subgraph generator 120 generates a set of mining candidate subgraphs by adding a word/phrase which is a component or by adding a conceptually higher word/phrase which is a superordinate conceptual element to frequent subgraphs already mined as substructures of sentences which belong to a predetermined genre. The frequent subgraph searcher 125 and mining candidate subgraph selector 130 perform the processes in FIGS. 1 to 6 using words/phrases as components and a conceptually higher word/phrase as a superordinate conceptual element.

The weighted support calculator 150 calculates weighted support which is the total number of subgraphs matched with mining candidate subgraphs in all objects. The superordinate concept candidate selector 165 selects a second mining candidate subgraph which becomes identical in substructure to a first mining candidate subgraph—i.e., second mining candidate subgraph which is to become a superordinate conceptual pattern of the first mining candidate subgraph—when a word/phrase which is a component contained in the first mining candidate subgraph is substituted with a conceptually higher word/phrase which is a superordinate conceptual element matched with the word/phrase. The frequent subgraph adder 170 adds the second mining candidate subgraph to a set of frequent subgraphs, and thereby generates a set of frequent subgraphs which is a substructure contained commonly in sentences of the predetermined genre, provided that the weighted support of the first mining candidate subgraph and the weighted support of the second mining candidate subgraph are not identical.

The frequent pattern mining apparatus 10 according to the second variation can mine a set of frequent subgraphs, i.e., subgraphs of words/phrases contained in the sentences which satisfy minimum support, out of a plurality of sentences with predetermined characteristics. Consequently, the frequent pattern mining apparatus 10 can mine a set of words/phrases contained in a plurality of sentences which are classified into a predetermined genre and can support classification of news articles and the like.

Figure 9:
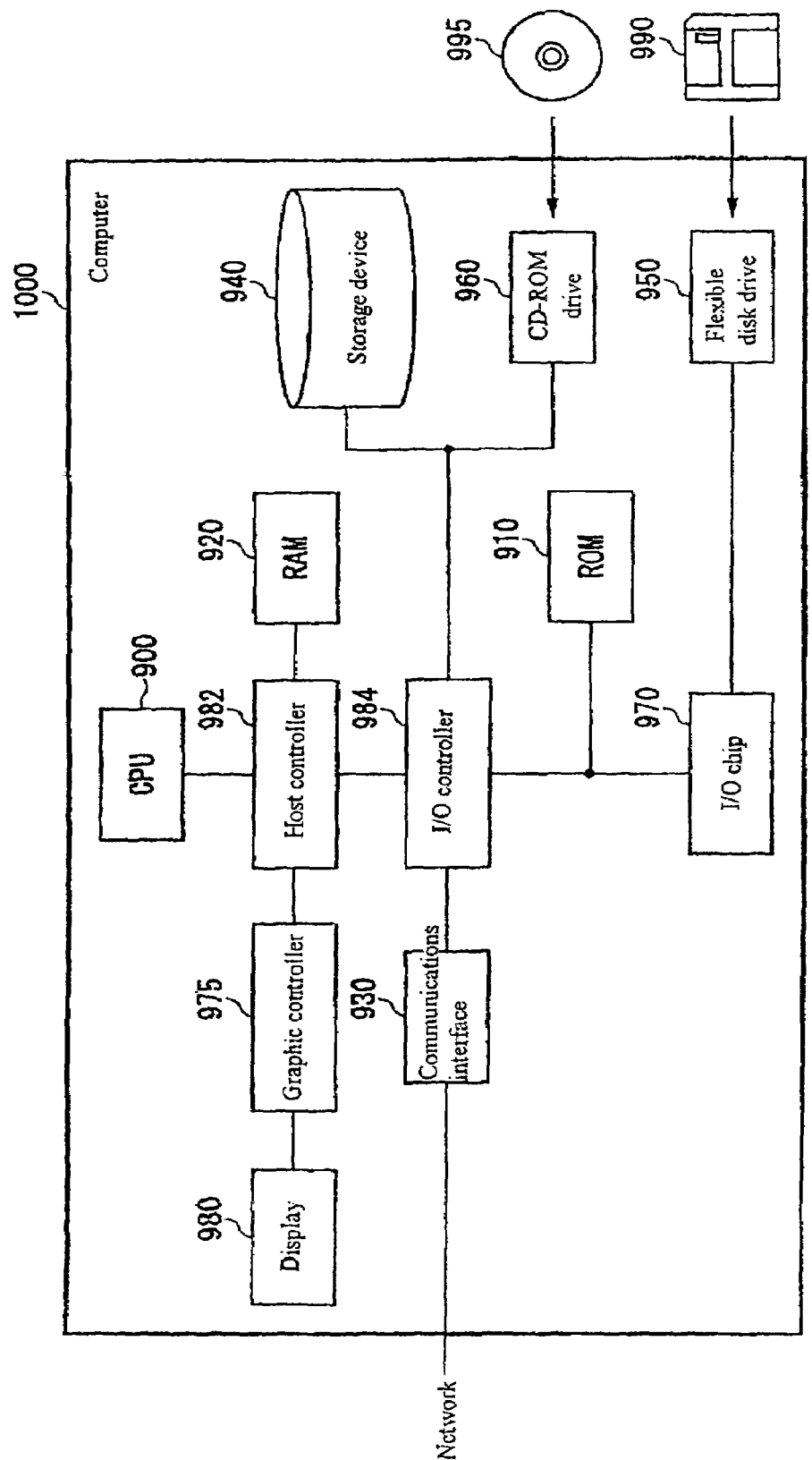
FIG. 9 shows an exemplary hardware configuration of a computer 1000 according to the embodiment of the present invention.

FIG. 9 shows an exemplary hardware configuration of a computer 1000 according to this embodiment. The computer 1000 according to this embodiment comprises a CPU 900 and its peripherals including a RAM 920, graphic controller 975, and display 980 which are mutually connected via a host controller 982; an input/output section including a communications interface 930, storage device 940, and CD-ROM drive 960 which are connected to the host controller 982 via an input/output controller 984; and a legacy input/output section including a ROM 910, flexible disk drive 950, and input/output chip 970 which are connected to the input/output controller 984.

The host controller 982 connects the RAM 920 with the CPU 900 and graphic controller 975 which access the RAM 920 at high transfer rates. The CPU 900 runs based on programs stored in the ROM 910 and RAM 920 and controls various components. The graphic controller 975 acquires image data generated in a frame buffer 980 in the RAM 920 by the CPU 900 and the like and displays it on the graphic controller 975. Alternatively, the graphic controller 975 may incorporate a frame buffer to store the image data generated by the CPU 900 and the like.

The input/output controller 984 connects the host controller 982 with the communications interface 930, storage device 940, and CD-ROM drive 960 which are relatively high-speed input/output devices. The communications interface 930 communicates with other devices via a network. The storage device 940 stores programs and data for use by the CPU 900 in the computer 1000. The CD-ROM drive 960 reads programs and data from a CD-ROM 995 and supplies them to the storage device 940 via the RAM 920.

The input/output controller 984 is connected with the ROM 910 as well as with the flexible disk drive 950, input/output chip 970, etc. which are relatively low-speed input/output devices. The ROM 910 stores a boot program which is executed when the computer 1000 starts up, programs which depend on hardware of the computer 1000, etc. The flexible disk drive 950 reads programs or data from a flexible disk 990 and supplies them to the storage device 940 via the RAM 920. The input/output chip 970 connects various input/output devices via the flexible disk drive 950 as well as via, for example, a parallel port, serial port, keyboard port, mouse port, etc.

The programs supplied to the storage device 940 via the RAM 920 are provided by the user, being stored on a storage medium such as the flexible disk 990, the CD-ROM 995, or an IC card. The programs are read from the storage medium, installed in the storage device 940 in the computer 1000 via the RAM 920, and executed by the CPU 900.

The program which is installed on the computer 1000 and makes it function as the frequent pattern mining apparatus 10 includes an object DB managing module, frequent subgraph DB managing module, mining candidate subgraph generating module, weighted support calculating module, mining candidate subgraph DB managing module, superordinate concept candidate selecting module, frequent subgraph adding module, and input/output module. The program and modules make the computer 1000 function as the object DB manager 102, frequent subgraph DB manager 115, mining candidate subgraph generator 120, weighted support calculator 150, mining candidate subgraph DB manager 160, superordinate concept candidate selector 165, and frequent subgraph adder 170, respectively. The mining candidate subgraph generating module has a mining candidate subgraph selecting module which includes a frequent subgraph searching module, component adding module, superordinate conceptual element searching module, superordinate conceptual element adding module, and support calculating module. These programs or modules make the computer 1000 function as the frequent subgraph searcher 125, component adder 135, superordinate conceptual element searcher 140, superordinate conceptual element adder 145, and support calculator 147 of the mining candidate subgraph selector 130, respectively.

Also, the storage device 940 functions as the object DB 100, conceptual hierarchy DB 105, frequent subgraph DB 110, and mining candidate subgraph DB 155.

The programs or modules described above may be stored in an external storage medium. The storage medium may be not only the flexible disk 990 or CD-ROM 995, but also an optical recording medium such as a DVD or PD, magneto-optical recording medium such as an MD, tape medium, or semiconductor memory such as an IC card. Alternatively, a hard disk or RAM installed in a server system connected to a private communications network or the Internet may be used as a recording medium and the programs may be supplied to the computer 1000 via the network.

The present invention has been described above by way of an embodiment, but the technical scope of the present invention is not limited to the scope of the embodiment described above. It will be apparent to those skilled in the art that various modifications or improvements can be made to the embodiment described above. It is obvious from the appended claims that results of such modifications or improvements can also be included in the technical scope of the present invention.

Definitions and theorems on which implementation of the frequent pattern mining apparatus 10 is based will be described below.

(Definition 1) Definition of a Labeled Graph

When a set V of vertices, set E of edges, set $L_V$ of vertex labels which represent types of vertex, and set $L_E$ of vertex labels which represent types of edges are given by Equation (1), a graph G is given by Equation (2). Here, the number |V| of vertices is referred to as the size of the graph G.

$$V=\{v_1, v_2, \ldots, v_k\},$$

$$E=\{e_h=(v_i, v_j)|v_i, v_j \in V\},$$

$$L_v=\{lb(v_i)|\forall v_i \in V\},$$

$$L_E=\{lb(e_h)|\forall e_h \in E\}, \quad (1)$$

$$G=(V, E, L_V, L_E) \quad (2)$$

(Definition 2) Topology

Topology is a graph left after label information is removed from the vertices and edges of the graph and consists only of information about connections of the vertices.

(Definition 3) Conceptual Hierarchy

A conceptual hierarchy is expressed by effective graphs which contain no loop. A superordinate concept of a concept a is expressed as f(a). An example of a conceptual hierarchy is shown in FIG. 3.

(Definition 4) Inclusion Relation

When graphs G=(V(G), E(G), $L_V$(G), $L_E$(G)) and Gs=(V(Gs), E(Gs), $L_V$(Gs), $L_E$(Gs)) are given and a function f which satisfies conditions given by Equation (3) exists, where $lb(v_i)$ and $lb(v_i, v_j)$ are labels of a vertex $v_i$ and edge $(v_i, v_j)$, respectively, the graph G includes the graph Gs. This relation is expressed as G Z Gs.

$v_i \in V(G_s) \ lb(v_i)=f(lb(\phi(v_i)))$ or $lb(\phi(v_i))$ $v_i, v_j \in V(G_s) \ lb(v_i, v_j)=f(lb(\phi(v_i), \phi(v_j)))$ or $lb((\phi v_i), \phi(v_j)) \quad (3)$ (Definition 5) Graph Pattern A frequent pattern mined as a frequent subgraph constitutes a graph contained in an object and is not necessarily limited to a connected graph.

(Definition 6) Support

When a set GD of graph data which represents a plurality of objects is provided, support sup(Gs) of a subgraph Gs is the ratio of graphs which contain the graph Gs to all the data in the set GD, as shown by Equation (4) below.

$$sup(G_s) = \frac{\text{the number of pieces of data including } G_s}{\text{the total number of pieces of data in object database}} \quad (4)$$

A graph structure which has a support equal to or higher than a minimum support specified by the user is referred to as a frequent subgraph. The frequent subgraph is not necessarily limited to part of the graph G which includes Gs, and may correspond to the entire graph G.

(Definition 7) Weighted Support

If #(P,G) denotes the number of occurrences of a pattern P in graph data G, then the weighted support of pattern P is given by Equation (5) below. However, overlapping sets of vertices count as one occurrence.

$$sup_w(P) = \sum_i \#(P, G_i) \quad (5)$$

The support given by Equation (4) can be expressed as Equation (6).

$$sup(P) = \sum_i \delta(\#P, G_i)$$

$$\delta(x) = \begin{cases} 1 & \text{if } x \neq 0 \\ 0 & \text{if } x = 0 \end{cases} \quad (6)$$

(Definition 8) Superordinate Conceptual Pattern

When a pattern $P_1$ and pattern $P_2$ have the same number of vertices and the same topology and $P_2$ includes $P_1$, then $P_2$ is called a superordinate conceptual pattern of $P_1$.

(Definition 9) Frequent Pattern Mining Problem

A frequent pattern mining problem involves mining all subgraph structures contained in a set of graph structures as frequent graphs when the set of graph structures and a minimum support are provided. However, if $P_2$ is a superordinate conceptual pattern of $P_1$ and if sup($P_1$)=sup($P_2$), then $P_2$ is not output because it has been overly abstracted and can be regarded to be virtually identical in subgraph structure to $P_1$.

(Theorem 1) Relationship Between Supports

If $P_2$ is a superordinate conceptual pattern of $P_1$ and if $sup_w(P_1)=sup_w(P_2)$, then sup($P_1$)=sup($P_2$).

Proof:

Assume that $\sup(P_1)=\sup(P_2)$ does not hold. Since $P_2$ is a superordinate conceptual pattern of $P_1$, Equation (7) below should hold.

$$G_i \supseteq P_1 \rightarrow G_i \supseteq P_2 \quad (7)$$

If $f_i$ denotes a function which associates $P_1$ with a subgraph which corresponds to $P_1$ in $G_i$ and if $y_i$ denotes a function which associates $P_2$ with a subgraph which corresponds to $P_2$ in $G_i$, then $\sup_w(P_2)^3 \sup_w(P_1)$ from Equation (7). Here, the equality holds when $|f_i|=|y_i|$ holds for all values of i, but from $\sup(P_1)^1 \sup(P_2)$, it follows that there exists graph data which contains $P_2$, but does not contain $P_1$. This is incompatible with $\sup_w(P_1)=\sup_w(P_2)$.

(Definition 10) Isomorphic Extension

When $P_2$ is a superordinate conceptual pattern of $P_1$, let us extend the pattern $P_1$ by adding a vertex to $P_1$ and let us denote the resulting pattern by $P'_1$. Then, let us extend the pattern $P_2$ as well by adding a vertex with the same vertex label and an edge with the same edge label to retain the topology and let us denote the resulting pattern by $P'_2$. This type of extension is referred to as isomorphic extension. Here, $P'_2$ is a superordinate conceptual pattern of $P'_1$.

(Theorem 2) If $P_2$ is a superordinate conceptual pattern of $P_1$ and if $\sup_w(P_1)=\sup_w(P_2)$, the supports of $P'_1$ and $P'_2$ obtained by isomorphically extending $P_1$ and $P_2$, respectively, satisfy $\sup(P'_1)=\sup(P'_2)$.

Proof:

Since $P'_2$ is a superordinate conceptual pattern of $P'_1$, graph data which includes $P'_1$ includes $P'_2$ as well. That is, $G_i Z P'_1 \circledR G_i Z P'_2$ and $\sup(P'_2)^3 \sup(P'_1)$. Thus, it is possible to prove that $\sup(P'_1)=\sup(P'_2)$ if it can be shown that Equation (8) below holds.

$$G_i \supseteq P'_2 \rightarrow G_i \supseteq P'_1 \quad (8)$$

$G_i$ which includes $P'_2$ also includes $P_2$. Besides, since $\sup_w(P_1)=\sup_w(P_2)$, $G_i$ includes $P_1$ as well. If a function of $P_1$ in relation to $G_i$ is denoted by $f_i$ and a function of $P_2$ in relation to $G_i$ is denoted by $y_i$, from $\sup_w(P_1)=\sup_w(P_2)$, it follows that $f_i=y_i$. Here, if a function of $P'_2$ in relation to $G_i$ is denoted by $y'_i$, there exists a function which gives $y_i$ when transition information about the vertex and edge added by the extension is subtracted from $y'_i$. According to the definition of isomorphic extension, $P'_1$ and $P'_2$ are isomorphic extensions of $P_1$ and $P_2$, respectively, made by the addition of a vertex or edge with the same label, so a function $y'_i$ of $P'_1$ in relation to $G_i$ must essentially exist. Thus, $G_i$ which includes $P'_2$ should include $P'_1$ as well, and hence Equation (8) holds.

(Theorem 3) If $P_2$ is a superordinate conceptual pattern of $P_1$ and if $\sup_w(P_1)=\sup_w(P_2)$, the supports of patterns obtained by isomorphically extending $P_1$ and $P_2$, respectively, one or more times, are always equal to each other.

Proof: The proof is evident from Theorem 2

Program Product

The invention may be implemented, for example, by having the frequent pattern mining as a software application (as an operating system element), a dedicated processor, or a dedicated processor with dedicated code. The frequent pattern mining capability described herein executes a sequence of machine-readable instructions, which can also be referred to as code. These instructions may reside in various types of signal-bearing media. In this respect, one aspect of the present invention concerns a program product, comprising a signal-bearing medium or signal-bearing media tangibly embodying a program of machine-readable instructions executable by a digital processing apparatus to perform a method for frequent pattern mining.

This signal-bearing medium may comprise, for example, memory in server. The memory in the server may be non-volatile storage, a data disc, or even memory on a vendor server for downloading to a processor for installation. Alternatively, the instructions may be embodied in a signal-bearing medium such as the optical data storage disc. Alternatively, the instructions may be stored on any of a variety of machine-readable data storage mediums or media, which may include, for example, a "hard drive", a RAID array, a RAMAC, a magnetic data storage diskette (such as a floppy disk), magnetic tape, digital optical tape, RAM, ROM, EPROM, EEPROM, flash memory, magneto-optical storage, paper punch cards, or any other suitable signal-bearing media including transmission media such as digital and/or analog communications links, which may be electrical, optical, and/or wireless. As an example, the machine-readable instructions may comprise software object code, compiled from a language such as "C++".

Additionally, the program code may, for example, be compressed, encrypted, or both, and may include executable files, script files and wizards for installation, as in Zip files and cab files. As used herein the term machine-readable instructions or code residing in or on signal-bearing media include all of the above means of delivery.

Other Embodiments

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

I claim:

1. A frequent pattern mining apparatus for mining a set of frequent subgraphs contained in objects which have a ratio not lower than a predetermined minimum ratio from among a plurality of objects represented by graph structures, the frequent pattern mining apparatus comprising:

a computer having a CPU and peripherals including a RAM, a graphic controller, a host controller, a display, an input/output section, an input/output controller, a storage device, the storage device storing conceptual hierarchy database code, mining candidate subgraph generator code, weighted support calculator code, superordinate concept candidate selector code, and frequent subgraph adder code;

the conceptual hierarchy database code in said storage device for storing correspondence between multiple predetermined types of component and a superordinate conceptual element matched with each of the multiple types of component;

the mining candidate subgraph generator in said storage device for generating a set of mining candidate subgraphs by adding the components or the superordinate conceptual element to the frequent subgraphs which have already been mined;

the weighted support calculator in said storage device for calculating weighted support by totaling the number of subgraphs matched with the mining candidate subgraphs in each of the plurality of objects;

the superordinate concept candidate selector code in said storage device for selecting which selects a second mining candidate subgraph which becomes identical to a first mining candidate subgraph when a component contained in the first mining candidate subgraph is substituted with the superordinate conceptual element matched with the component; and the frequent subgraph adder code in said storage device for adding the second mining candidate subgraph to the set of mining candidate subgraphs if first weighted support which is the weighted support of the first mining candidate subgraph is not identical to second weighted support which is the weighted support of the second mining candidate subgraph;

wherein each of the plurality of objects to be frequent pattern mined is represented by a graph structure which has a plurality of vertices and a plurality of edges contained in the object as components and wherein each of the plurality of objects is a chemical substance in which the plurality of vertices correspond to a plurality of atoms and the plurality of edges correspond to links among the plurality of atoms;

each of the chemical substances selected based on experimental analysis results which indicate that the chemical substance provides predetermined medicinal benefits;

the conceptual hierarchy database stores correspondence between multiple predetermined types of atom and a conceptually higher atom matched with each of the multiple types of atom as correspondence between the multiple types of component and the superordinate conceptual element matched with each of the multiple types of component;

as a substructure of the chemical substance which provides the predetermined medicinal benefits, the mining candidate subgraph generator generates a set of mining candidate subgraphs by adding atoms or the conceptually higher atoms to the freciuent subgraphs which have already been mined;

the weighted support calculator calculates the weighted support by totaling the number of subgraphs matched with the mining candidate subgraphs in each of the plurality of objects;

the superordinate concept candidate selector selects the second mining candidate subgraph which has the same substructure as the first mining candidate subgraph when an atom contained in the first mining candidate subgraph is substituted with the superordinate conceptual element matched with the atom; and the frequent subgraph adder generates a substructure contained commonly in chemical substances which provide the predetermined benefits by adding the second mining candidate subgraph to the set of freciuent subgraphs, provided that the first weighted support and the second weighted support are not identical.

2. The frequent pattern mining apparatus according to claim 1 wherein the mining candidate subgraph generator code in said storage device further comprises component adder code which generates the frequent graph candidate by adding one component to one frequent subgraph which has already been mined;

said superordinate concept element searcher code which searches the conceptual hierarchy database for one superordinate conceptual element matched with the one component using the one component as a search key; and superordinate conceptual element adder code in said storage device which generates the mining candidate subgraph by adding the one superordinate conceptual element to the one frequent subgraph.

3. The frequent pattern mining apparatus according to claim 1, further comprising frequent subgraph database code in said storage device which establishes a frequent subgraph databse in said storage device and stores the frequent subgraphs by associating them with their size determined based on the number of their components, wherein the mining candidate subgraph generator code comprises: frequent subgraph searcher code which searches the frequent subgraph database for frequent subgraphs which have a first size, and the mining candidate subgraph selector which selects subgraphs of a second size larger than the first size as the mining candidate subgraphs if the support of the subgraphs is not lower than the minimum ratio, where the subgraphs of the second size are produced by adding a component or superordinate conceptual element to the retrieved frequent subgraphs and the support represents the ratio of the objects which contain subgraphs matched with the subgraphs of the second size;

the weighted support calculator code calculates the weighted support of the mining candidate subgraphs with the second size; and the frequent subgraph adder code stores the second mining candidate subgraph in the frequent subgraph database by associating the second mining candidate subgraph with the second size, provided that the first weighted support and the second weighted support are not identical.

4. The frequent pattern mining apparatus according to claim 1, wherein: the conceptual hierarchy database code further stores correspondence between each component and first and second superordinate conceptual elements matched with the component;

the superordinate concept candidate selector code further selects a third mining candidate subgraph which coincides with the first mining candidate subgraph when a component contained in the first mining candidate subgraph is substituted with the superordinate conceptual element matched with the component; and the frequent subgraph adder code adds the second mining candidate subgraph, but not the third mining candidate subgraph, to the set of frequent subgraphs if the second weighted support is identical to third weighted support which is the weighted support of the third mining candidate subgraph and if a set of subgraphs to be matched with the second mining candidate subgraph are identical to a set of subgraphs to be matched with the third mining candidate subgraph in each of the plurality of objects, provided that the first weighted support and the second weighted support are not identical.

5. A frequent pattern mining method for making a computer mine a set of frequent subgraphs contained in objects which have a ratio not lower than a predetermined minimum ratio from among a plurality of objects represented by graph structures, the frequent pattern mining method comprising: a conceptual hierarchy database management step of making the computer manage a conceptual hierarchy database which stores correspondence between multiple predetermined types of component and a superordinate conceptual element matched with each of the multiple types of component;

a mining candidate subgraph generating step of making the computer generate a set of mining candidate subgraphs by adding the components or the superordinate conceptual element to the frequent subgraphs which have already been mined;

a weighted support calculating step of making the computer calculate weighted support by totaling the number of subgraphs matched with the mining candidate subgraphs in each of the plurality of objects;

a superordinate concept candidate selection step of making the computer select a second mining candidate subgraph which is identical to a first mining candidate subgraph when a component contained in the first mining candidate subgraph is substituted with the superordinate conceptual element matched with the component; and a frequent subgraph adding step of making the computer add the second mining candidate subgraph to the set of mining candidate subgraphs if first weighted support which is the weighted support of the first mining candidate subgraph is not identical to second weighted support which is the weighted support of the second mining candidate subgraph;

wherein each of the plurality of objects is represented by a graph structure which has a plurality of vertices and a plurality of edges contained in the object as components, and wherein each of the plurality of objects is a chemical substance in which the plurality of vertices correspond to a plurality of atoms and the plurality of edges correspond to links among the plurality of atoms;

each of the chemical substances selected based on experimental analysis results which indicate that the chemical substance provides predetermined medicinal benefits;

the conceptual hierarchy database stores correspondence between multiple predetermined types of atom and a conceptually higher atom matched with each of the multiple types of atom as correspondence between the multiple types of component and the superordinate conceptual element matched with each of the multiple types of component;

as a substructure of the chemical substance which provides the predetermined medicinal benefits, the mining candidate subgraph generator generates a set of mining candidate subgraphs by adding atoms or the conceptually higher atoms to the frequent subgraphs which have already been mined;

the weighted support calculator calculates the weighted support by totaling the number of subgraphs matched with the mining candidate subgraphs in each of the plurality of objects;

the superordinate concept candidate selector selects the second mining candidate subgraph which has the same substructure as the first mining candidate subgraph when an atom contained in the first mining candidate subgraph is substituted with the superordinate conceptual element matched with the atom; and the frequent subgraph adder generates a substructure contained commonly in chemical substances which provide the predetermined benefits by adding the second mining candidate subgraph to the set of freciuent subgraphs, provided that the first weighted support and the second weighted support are not identical.

6. A program product comprising a machime-readable data storage medium having computer readable code thereon for making a computer function as a frequent pattern mining apparatus which mines a set of frequent subgraphs contained in objects which have a ratio not lower than a predetermined minimum ratio from among a plurality of objects represented by graph structures, the program configuring and controlling the computer to function as: a conceptual hierarchy database manager which manages a conceptual hierarchy database which stores correspondence between multiple predetermined types of component and a superordinate conceptual element matched with each of the multiple types of component, a mining candidate subgraph generator which generates a set of mining candidate subgraphs by adding the components or the superordinate conceptual element to the frequent subgraphs which have already been mined, a weighted support calculator which calculates weighted support by totaling the number of subgraphs matched with the mining candidate subgraphs in each of the plurality of objects, a superordinate concept candidate selector which selects a second mining candidate subgraph which becomes identical to a first mining candidate subgraph when a component contained in the first mining candidate subgraph is substituted with the superordinate conceptual element matched with the component, and a frequent subgraph adder which adds the second mining candidate subgraph to the set of mining candidate subgraphs if first weighted support which is the weighted support of the first mining candidate subgraph is not identical to second weighted support which is the weighted support of the second mining candidate subgraph;

wherein each of the plurality of objects is represented by a graph structure which has a plurality of vertices and a plurality of edges contained in the object as components, and wherein each of the plurality of objects is a chemical substance in which the plurality of vertices correspond to a plurality of atoms and the plurality of edges correspond to links among the plurality of atoms;

each of the chemical substances selected based on experimental analysis results which indicate that the chemical substance provides predetermined medicinal benefits;

the conceptual hierarchy database stores correspondence between multiple predetermined types of atom and a conceptually higher atom matched with each of the multiple types of atom as correspondence between the multiple types of component and the superordinate conceptual element matched with each of the multiple types of component;

as a substructure of the chemical substance which provides the predetermined medicinal benefits, the mining candidate subgraph generator generates a set of mining candidate subgraphs by adding atoms or the conceptually higher atoms to the freciuent subgraphs which have already been mined;

the weighted support calculator calculates the weighted support by totaling the number of subgraphs matched with the mining candidate subgraphs in each of the plurality of objects;

the superordinate concept candidate selector selects the second mining candidate subgraph which has the same substructure as the first mining candidate subgraph when an atom contained in the first mining candidate subgraph is substituted with the superordinate conceptual element matched with the atom; and the freciuent subgraph adder generates a substructure contained commonly in chemical substances which provide the predetermined benefits by adding the second mining candidate subgraph to the set of freciuent subgraphs, provided that the first weighted support and the second weighted support are not identical.

* * * * *